United States Patent
Anderson et al.

(10) Patent No.: US 6,430,996 B1
(45) Date of Patent: Aug. 13, 2002

(54) PROBE AND INTEGRATED ICE DETECTION AND AIR DATA SYSTEM

(76) Inventors: Mark Anderson, 10401 Honda Dr., Littleton, CO (US) 80127; Larry Meiners, 1935 Cedar Dr., Rapid City, SD (US) 57702; Joe Burns, 11663 Pine Valley Dr., Franktown, CO (US) 80116

( * ) Notice: Subject to any disclaimer, the term of this patent is extended or adjusted under 35 U.S.C. 154(b) by 0 days.

(21) Appl. No.: 09/572,017

(22) Filed: May 16, 2000

Related U.S. Application Data

(63) Continuation-in-part of application No. 09/437,290, filed on Nov. 9, 1999.

(51) Int. Cl.$^7$ ............................................ G01W 1/00
(52) U.S. Cl. ........................................................ 73/170.26
(58) Field of Search ..................... 73/170.02, 170.14, 73/170.26, 178 R, 180, 182, 866.65, 866.66, 598, 600; 250/227.25, 227.28, 577, 903; 356/128, 135, 136, 137; 340/581, 580, 583, 962; 244/1 R, 134 F

(56) References Cited

U.S. PATENT DOCUMENTS

| | | | |
|---|---|---|---|
| 3,940,622 A | * 2/1976 | Stallabrass et al. | 250/338 |
| 4,378,696 A | 4/1983 | DeLeo et al. | 73/861.65 |
| 4,782,331 A | 11/1988 | Martens | 340/583 |
| 4,797,660 A | 1/1989 | Rein, Jr. | 340/583 |
| 4,803,470 A | 2/1989 | Fineman | 356/136 |
| 4,836,019 A | 6/1989 | Hagen et al. | 73/180 |
| 4,851,817 A | * 7/1989 | Brossia et al. | 340/583 |
| 5,025,661 A | 6/1991 | McCormack | 73/861.66 |
| 5,241,866 A | 9/1993 | Rossow | 73/182 |
| 5,296,853 A | 3/1994 | Federow et al. | 340/962 |
| 5,331,849 A | 7/1994 | Hedberg et al. | 73/178 R |
| 5,354,015 A | 10/1994 | Meador | 244/134 F |
| 5,359,888 A | 11/1994 | Hagen | 73/178 R |
| 5,369,993 A | 12/1994 | Hagan | 374/138 |
| 5,396,079 A | 3/1995 | Evers et al. | 250/577 |
| 5,466,067 A | 11/1995 | Hagen et al. | 73/180 |
| 5,507,183 A | 4/1996 | Larue et al. | 73/598 |
| 5,585,557 A | 12/1996 | Loschke et al. | 73/170.14 |
| 5,596,320 A | 1/1997 | Barnes | 340/962 |
| 5,601,254 A | 2/1997 | Ortiz et al. | 244/1 R |
| 5,616,861 A | 4/1997 | Hagen | 73/170.02 |
| 5,628,565 A | 5/1997 | Hagen et al. | 73/170.02 |
| 5,695,155 A | 12/1997 | Macdonald et al. | 244/134 F |

* cited by examiner

*Primary Examiner*—William Oen
(74) *Attorney, Agent, or Firm*—Ancel W. Lewis, Jr.

(57) ABSTRACT

An integrated air data probe capable of measuring pressure, temperature, relative humidity, turbulence, heading, air speed, the presence of ice, and other relevant measurements for use in building a real time map of the aircraft flying conditions. The probe is attached to the external surface of an airplane such as the wing, fuselage or empannage and is adapted to collect and relay these measurements to a receiving station. By utilizing these probes on numerous airplanes, real time data from numerous data points can be mapped to provide pilots and airlines complete information regarding flying conditions. Additionally, the probe includes a recessed surface for detecting the presence, thickness, and continued buildup of ice by mounting the recessed surface directly into the airflow. One or more light beams are passed over and parallel to the recessed surface, and if ice is present the beams are interrupted.

23 Claims, 4 Drawing Sheets

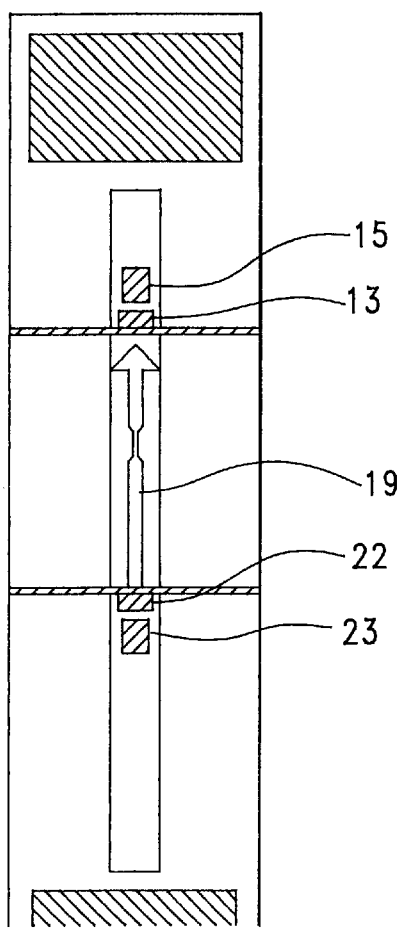
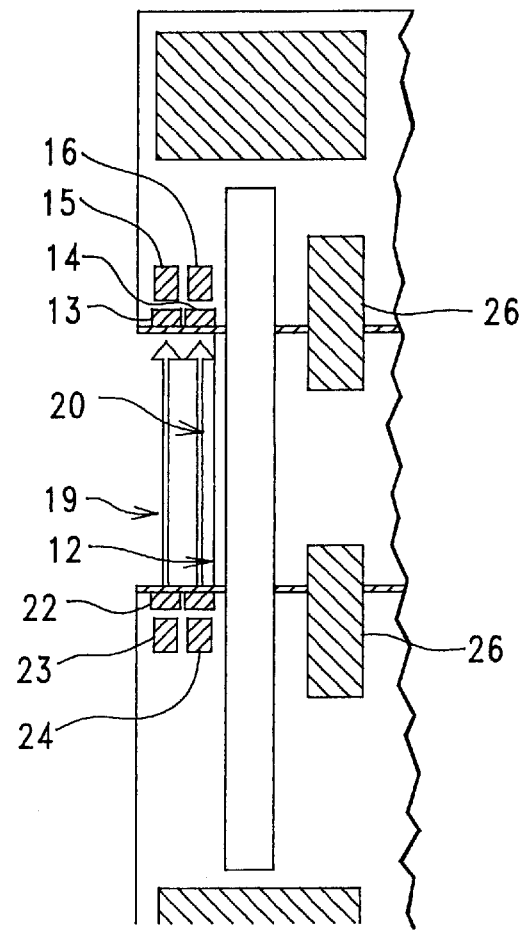
FIG.5          FIG.6
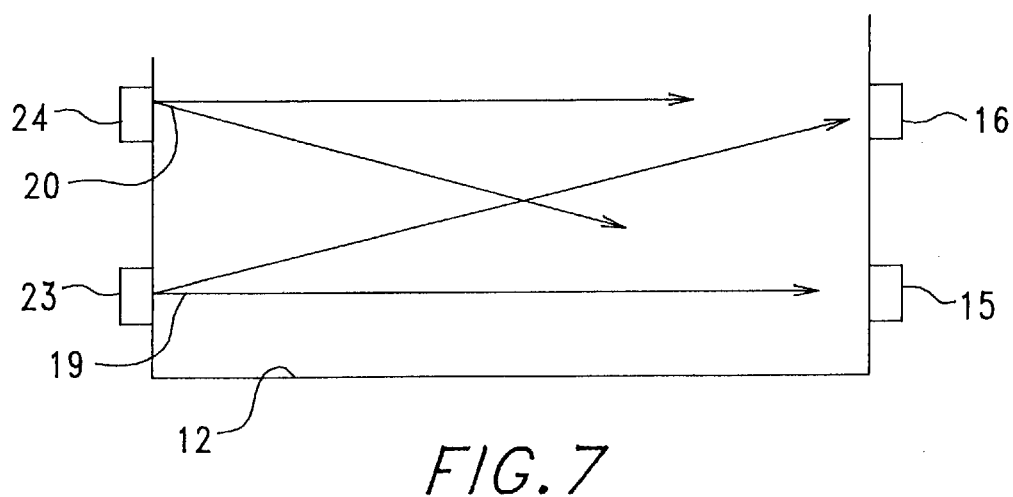
FIG.7

PROBE AND INTEGRATED ICE DETECTION AND AIR DATA SYSTEM

CROSS-REFERENCE TO RELATED APPLICATIONS

This application is a continuation-in-part of application Ser. No. 09/437,290 filed on Nov. 9, 1999, the entire disclosure of which is hereby incorporated by reference.

BACKGROUND OF THE INVENTION

The present invention relates to the field of air data probes and more particularly to a new and improved air data probe system and method to be used simultaneously to map real time atmospheric conditions and to detect the presence, thickness, and continued buildup of ice on the exterior surface of an aircraft. Sensing air data information such as forward air pressure, ambient air pressure, temperature, and humidity is known, and an example of such sensing devices is illustrated in U.S. Pat. No. 5,616,861. Additionally, U.S. Pat. No. 5,359,888 discloses an air data probe for measuring air turbulence and wind shear. Typically these probes are positioned on the surface of the fuselage of an airplane to measure local airflow conditions. This information is then relayed to the pilot to inform the pilot of the current flying conditions.

Several devices for optical ice detection have been previously disclosed. One such device incorporates a sensor at one end of an optical channel comprised of a fiber optic bundle. The fiber optic bundle totally reflects light internally when no ice is present, but when water or ice is present, some of the incident light is refracted externally. Another device attempts to detect ice and ice depth by using two or more optical fibers to transmit light and receive reflected light. The device relies on reflections from the surface at the ice/air interface to assess the presence and depth of ice. Other devices use single optical fibers to detect the presence of ice through the scattering or reflection of light at the end of the optical fiber. These devices suffer from serious technical limitations due to roughness of the ice surface and imperfections in the ice's scattering of the light.

SUMMARY OF THE INVENTION

The present invention generally relates to an integrated air data probe capable of remotely sensing in-flight meteorological conditions. A ground-based network would then have the ability to independently monitor lower and upper atmospheric weather and environmental conditions and thus more accurately map, forecast, and relay those conditions to other aircraft and to ground applications. A very large number of aircraft can be equipped with the air data probe, which will permit the sampling of atmospheric conditions from a large pool of data points. Such a system can provide atmospheric information that is either not available or very limited through present technologies such as ground stations, satellites, or weather balloons. The data from these probes can be transmitted to a network of ground stations for analysis, for use in modeling, and for construction of a real time map of the present flying and atmospheric conditions. Because of the large number of integrated data probes, this data will lead to improve meteorological modeling and weather forecasting. Additionally, this information can be used to create a real time map of where actual icing and significant turbulence exists. This map can then be transmitted to aircraft for use in planning optimum flight altitudes and headings, promoting safety and comfort, and reducing flight times and fuel consumption. Although the present invention is particularly useful in planning the flights of other aircraft, it should be appreciated that the invention is also useful in ground activity which requires prediction of weather, such as planning recreational events, alerting emergency personal, etc.

In a preferred form of the invention, an airfoil shaped probe is attached to the external surface of an airplane such as the wing, fuselage, or empannage and is adapted to measure various conditions and relay the measurements to a receiving station. The probe may, for example, measure airspeed, pressure altitude functions, temperature, humidity, static air temperature, relative air humidity, heading, turbulence, and ice build-up. With the exception of ice build-up, these measurements are achieved and collected by conventional devices. Dew point may also be calculated using the temperature, pressure, and humidity data. Additionally, when probe data is combined with aircraft position data, such as GPS data, winds aloft can be calculated.

With respect to ice detection, the probe includes a recessed surface, and by positioning the recessed surface directly into the airflow, the probe detects the presence, thickness, and continued buildup of ice. One or more light beams are passed over and substantially parallel to the recessed surface, and as ice develops on the recessed surface, ice will obstruct the beam detector, such that the beam will no longer be detectable by the beam detector. Preferably, the intensity of the detected beam will fall below a threshold detectable intensity of light and will effectively not be detected, or the detected intensity will be below a selected intensity value, that will be interpreted as being caused by the presence of ice. For best results, the recessed surface faces directly into the airflow, preferably in the laminar flow. The length of the recessed surface is set to optimize the system for the specific application involved. The beams can be of any appropriate wavelength, however, for best results, visible, infrared, or ultraviolet beams should be used.

If two or more beams are used, then each beam emitter may be paired with a beam detector and the corresponding beam detector detects only the beam from that emitter. This can be accomplished by numerous methods. For example, by powering each prescribed beam emitter alternately and sampling the output of the corresponding detector, by electronically modulating the beam from a single emitter to a specific frequency with corresponding detectors designed to respond to the specific frequency, or by using an optical filter that passes only a specific range of wavelengths. The invention also may utilize an optical filter placed in front of the detector to filter out ambient light, may utilize redundant temperature sensors to measure the temperature of the probe, and may utilize a probe heater to melt accumulated ice to assess continued ice accumulation.

There has thus been outlined features of the invention in order that the detailed description thereof that follows may be better understood, and in order that the present contribution to the art may be better appreciated. There are, of course, additional features of the invention that will form the subject matter of the claims appended hereto. In this respect, before explaining at least one embodiment of the invention in detail, it is to be understood that the invention is not limited in its application to the details of construction and to the arrangements of the components set forth above or in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The accompanying drawings illustrate a preferred embodiment of the present invention according to the best mode presently devised for practical application of the principles thereof, and in which:

FIG. 5 is a front zoom view of a second preferred ice detection embodiment of the leading edge of the integrated air data probe, shown in FIG. 1;

FIG. 6 is a side zoom view of a second preferred ice detection embodiment of the leading edge of the integrated air data probe, shown in FIG. 1;

FIG. 7 is a side view of a third preferred ice detection embodiment of the leading edge of the integrated air data probe, shown in FIG. 1;

DETAILED DESCRIPTION OF THE INVENTION

Figure 1:
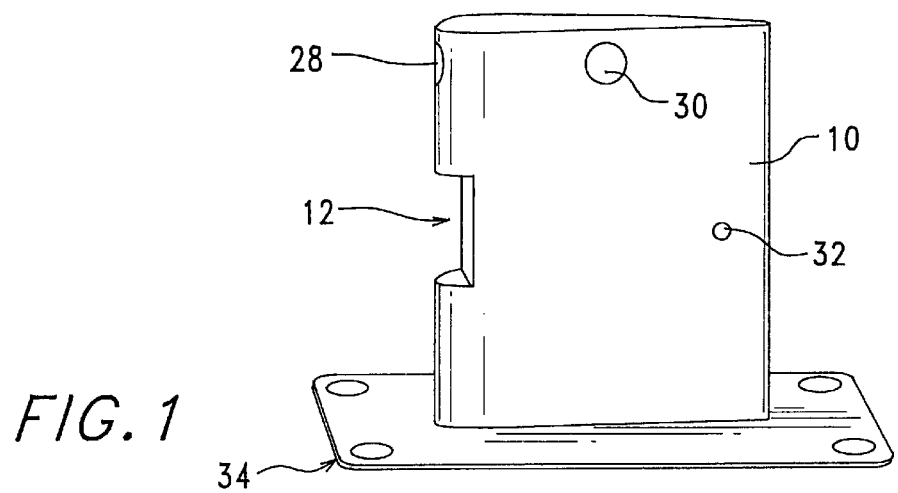
FIG. 1 is a side view of an integrated air data probe according to one embodiment of the present invention.
Figure 2:
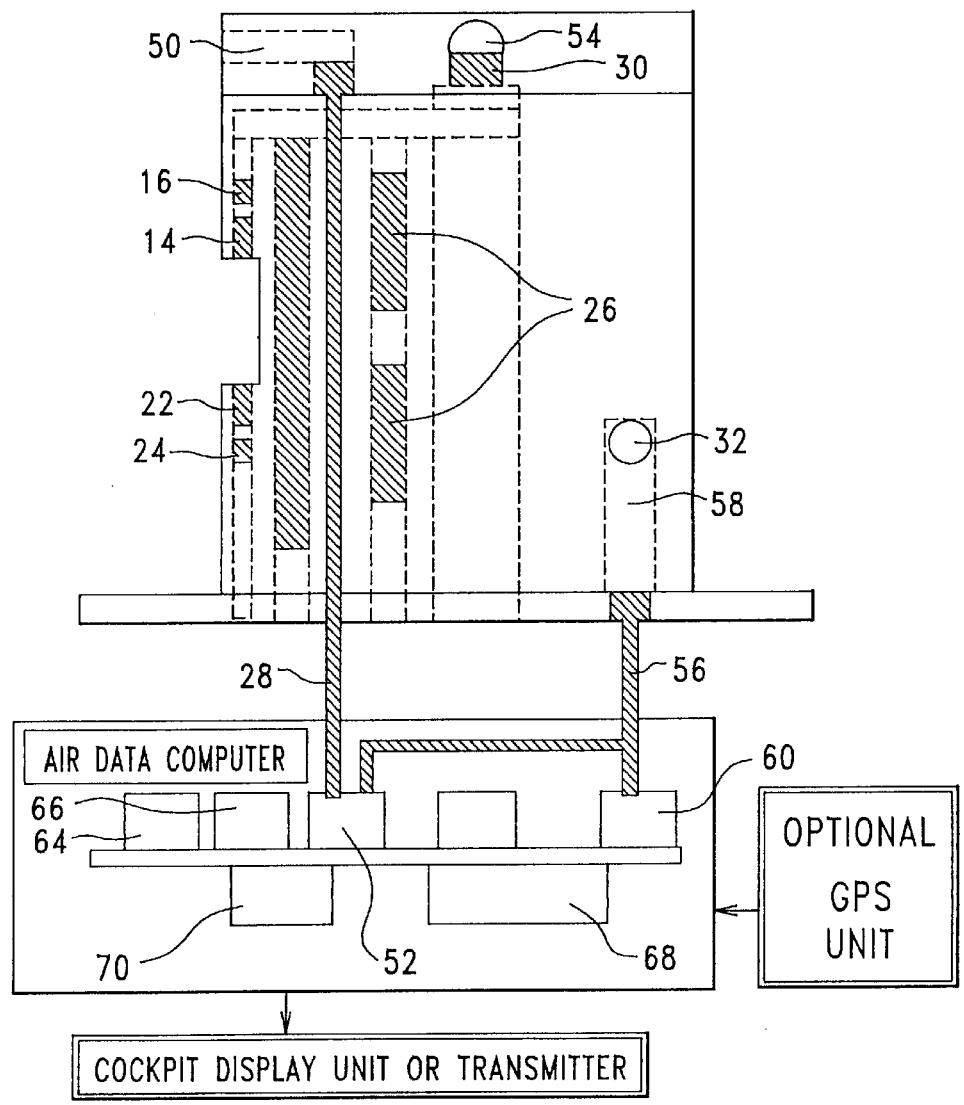
FIG. 2 is structural illustration of a preferred embodiment of the invention of FIG. 1.
Figure 3:
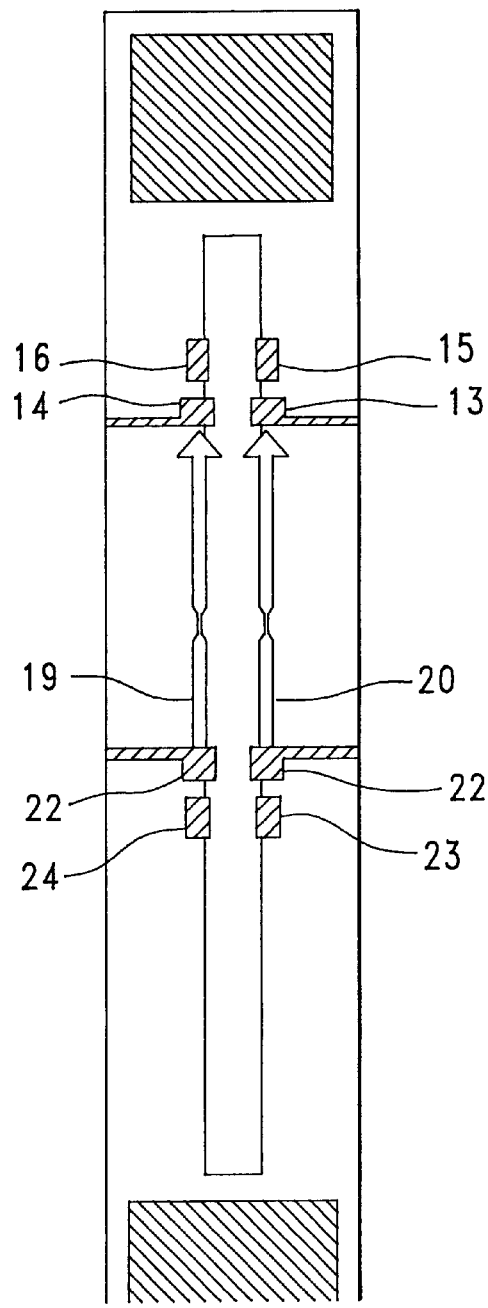
FIG. 3 is front zoom view of a preferred ice detection embodiment of the leading edge of the integrated air data probe, shown in FIG. 1.
Figure 4:
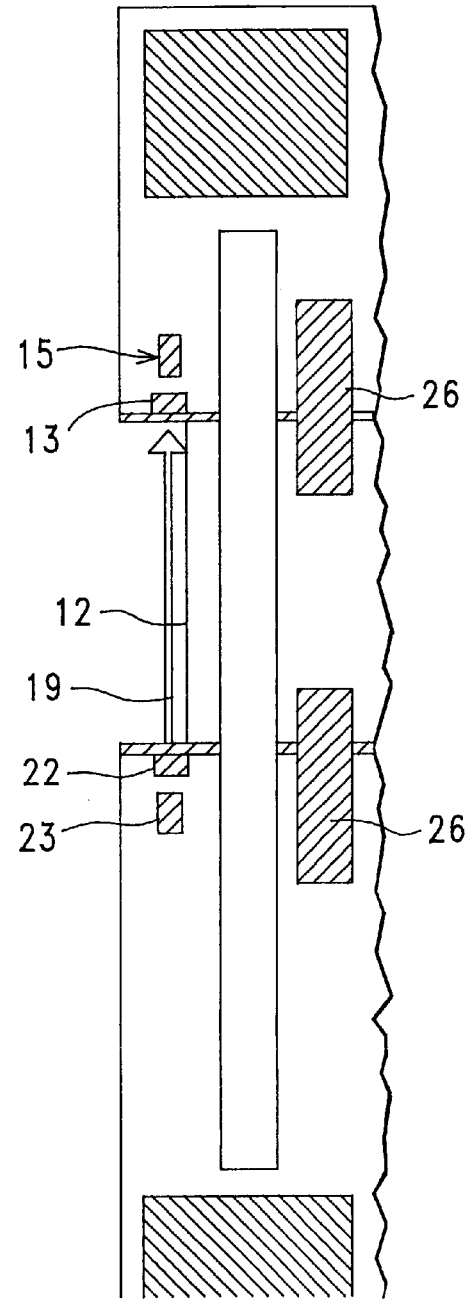
FIG. 4 is a side zoom view of the leading edge of integrated aid data probe and shows a preferred iced detection embodiment, shown in FIG. 1.
Figure 8:
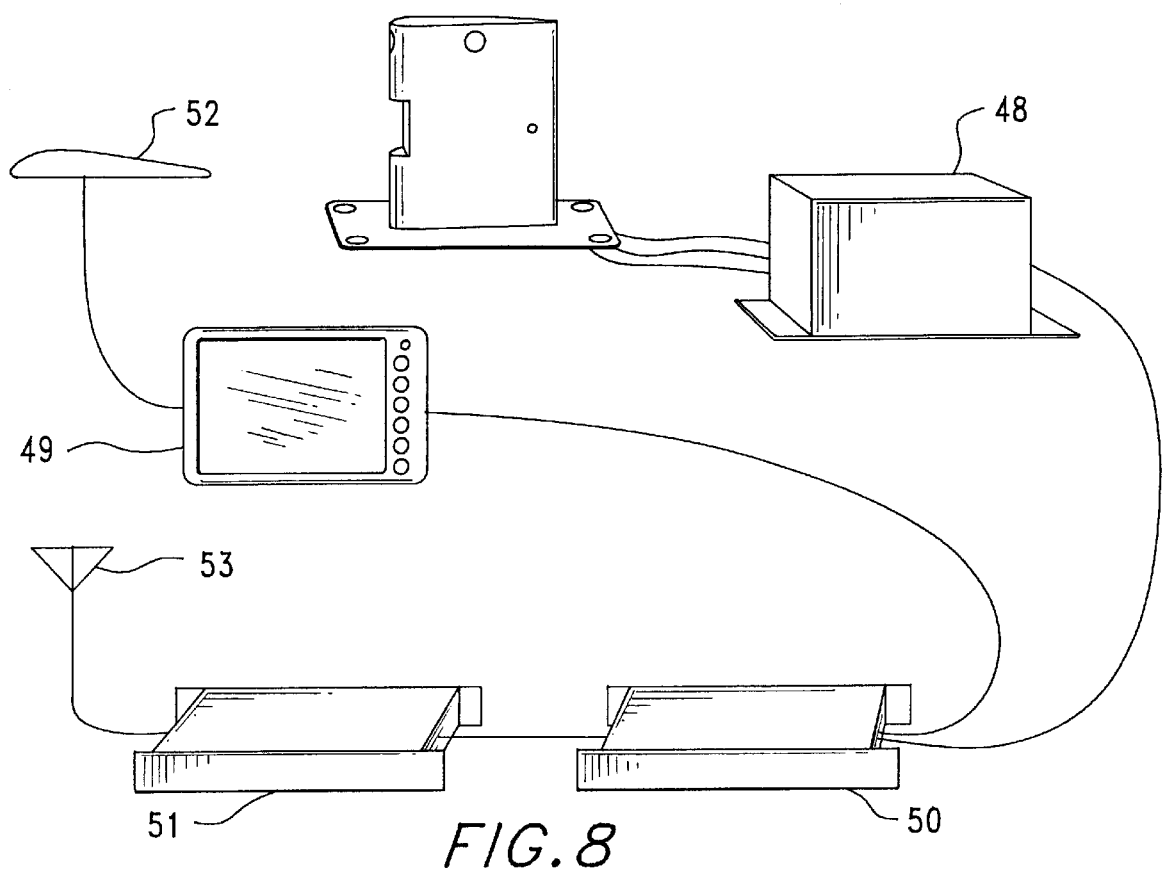
FIG. 8 is a block diagram of a data and display gathering system employing the air data probe in FIG. 1.
Figure 9:
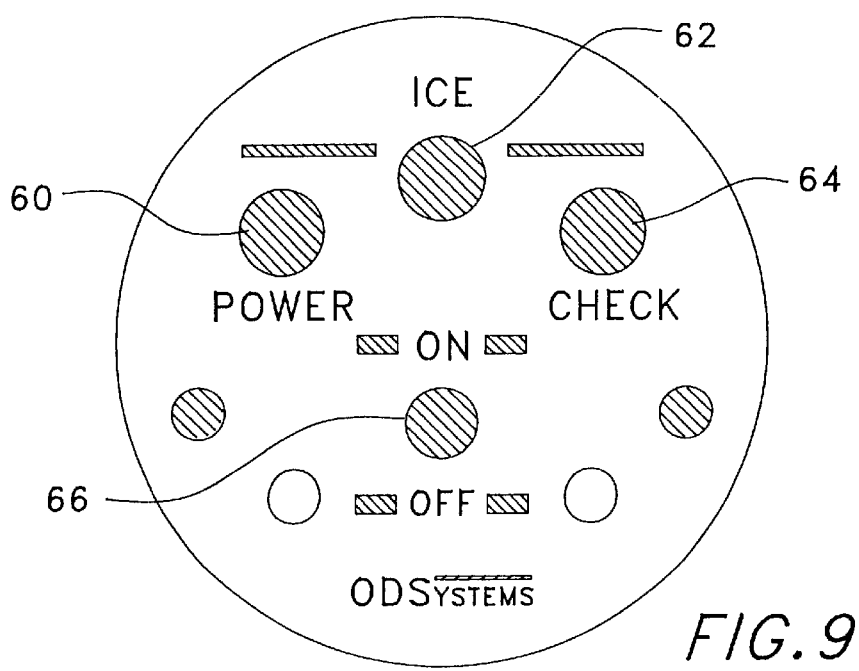
FIG. 9 is a schematic diagram of a preferred cockpit display module that may be utilized with the system shown in FIG. 7.

In the drawings like reference numerals throughout the various figures refer to the same item. Referring now to the drawings, FIGS. 1 and 2 is a side view of an integrated air data probe according to one embodiment of the present invention. FIGS. 3 and 4 illustrate a first preferred ice detection embodiment of the integrated air data probe; FIGS. 5 and 6 illustrate a second preferred ice detection embodiment of the integrated air data probe; and FIG. 7 illustrates a third preferred iced detection embodiment of the integrated air data probe. FIG. 8 is a block diagram of a data gathering system utilizing the probe, and FIG. 9 is a schematic diagram of a preferred cockpit display module that may be utilized with the system shown in FIG. 8.

As is illustrated in FIG. 1, the preferred shape of the probe is configured as a streamlined airfoil, however it will be readily understood that the invention is conformable for use with other shapes. In the preferred embodiment the probe is fashioned as a low drag symmetrical airfoil. The probe may be mounted, using conventional means, to the. outside surface of the fuselage or a wing at a location preferably where there is an uninterrupted external laminar airflow. For best results the location should be determined for each individual aircraft type.

The preferred form of the probe, as shown in FIGS. 1 and 2, broadly comprises an upstanding housing 10 fixed to or integrally formed with a substantially planar attachment plate 34. The attachment plate 34 is adapted to rest against the aircraft and may be attached to the aircraft either below or above the aircraft skin, and is provided with a plurality of apertures adapted to receive screws or bolts therethrough. The leading edge of the housing 10 possesses a notched or recessed surface 12 used for ice detection. The housing 10 should be oriented such that the recessed surface 12 faces the airflow and is positioned in laminar flow. A pilot tube 28, located near the top of the leading edge of the housing 10, measures forward air pressure. Two static ports 32, located on opposite sides to measure slip and approximately midway up and near the trailing edge of the housing 10, measure ambient pressure. Airspeed is measured by sensing the difference between the pitot and static or ambient pressures. The absolute or static or ambient pressure sensed by the two static 32 ports is the average of the two static pressures and indicates altitude. A temperature/humidity sensor 30 is mounted within an ambient condition exposure hole, located near the top of and about midway between the leading and trailing edge of the housing 10. For best results the temperature sensor 30 is either a thermistor or platinum device that changes resistance with temperature. When a current is passed through this device, any temperature difference will result in a proportional voltage change. Either a capacitive or resistance change sensor (not shown) senses humidity, and dew point may be calculated when the temperature, humidity and pressure altitude are known.

FIG. 2 additionally shows a pitot hole cavity or inlet opening 50 that allows air to be collected by the pitot tube 28 and transported to a differential pressure sensor 52. An ambient temperature and humidity hole 54 allows the temperature sensor 30 to measure the ambient air temperature. A static pressure port 32 allows air to travel through the static pressure cavity 58 and be collected by the static pressure tube 56 and is then measure by the static pressure sensor 60 and the differential pressure sensor 52. The integrated air data probe may also utilize a magnetic heading sensor 64, and accelerometer 66, a microprocessor 68, and an A/D converter 70.

FIGS. 3 and 4 are front and side zoom views of the leading edge of a preferred ice detection embodiment that detects ice by a pair of emitters 23 and 24 emitting corresponding light beams 19 and 20, each of which travel through a corresponding transparent window plate 22 that protects the associated emitter 23 and 24. The light beams 19, 20 then each travel through an ambient region created by the recess and then upwardly through a pair of corresponding optical filters 13, 14 before being detected by a pair of corresponding beam detectors 15, 16 such as a photodiode, phototransistor or photodarlington. The beams 19 and 20 are 0.02 inches away from the recessed surface 12. The optical filters 13, 14 isolate the beams 19, 20 from ambient light so that the detectors 15, 16 monitor essentially only the intensity of the associated light beam 19, 20. An electrical heater 26 may be used to melt and clear any ice from the region within the recessed surface 12 for the continued detection of ice.

Each beam 19, 20 is preferably formed of infrared light and is generated by emitters 23, 24 comprised of a light emitting diode (LED) or a laser diode, however, any electromagnetic beam may be employed. For the best result a beam of infrared light with a wavelength in excess of 1 micron is preferred and will be used throughout this detailed description of a preferred embodiment of the invention. The invention is described using two beams for ice detection, however the invention will work with one or more beams. When two or more beams are used to detect the presence of ice, the beams may be placed at the same depth with respect to the recessed surface 12, at varying depths with respect to the recessed surface 12, or any combination thereof. FIGS. 5, 6, and 7 illustrate additional preferred ice detection embodiments where beams 19, 20 are placed at different depths from the leading edge of the housing 10, within the ambient region created by the recessed surface 12.

If two or more beams are used, then each light emitter and light detector may be correspondingly paired, such that light from each light emitter is detected only by its corresponding detector. In the event that one beam is interrupted due to contamination, any other beams are still available for ice detection. In the second preferred embodiment of the ice detection, two or more beams are positioned at pre-selected distances from the leading edge of the housing 10 within the recessed surface 12. The beams are positioned such that one beam will be substantially parallel to and slightly away from the recessed surface 12 to indicate the onset of icing, while the other beams will be positioned at further distances away from the recessed surface 12 to detect the continued buildup of ice. In a variation of the second preferred embodiment not shown, beams will be positioned at various distances away from the recessed surface 12, and at each sequential position, two or more beams will be used for contamination rejection.

A third preferred embodiment of the ice detection system, as shown in FIG. 7, shows an ice detection system where the emitters are positioned at pre-selected distances from the leading edge of the housing 10 within the ambient region created by the recessed surface 12. The emitters 23, 24 are not paired to corresponding detectors 15, 16, thus the detectors 15, 16 are able to detect beams 19, 20 from either emitter. In this third embodiment, it is preferable that the beams 19, 20 radiate substantially spherically from the emitters 23, 24. Additionally, the emitters 23, 24 may be pulsed, emit differing wavelengths, or utilize optical filters that only pass specific wavelengths, to allow the detectors to identify the source of the beam. For the purpose of illustration, and not limitation, this embodiment is depicted using two emitters and two detectors. It is anticipated that a plurality of emitters and a plurality of detectors can be constructed using the principles outlined above.

A thermometer may be used to continuously measure the temperature of the probe, and may cooperate with the probe system to determine the presence of ice and contamination. When the temperature is below 10 degrees Celsius, and at least one beam is obstructed for greater than 10 seconds, there is an indication of ice and the ice warning LED on the cockpit display is activated. If one beam is used to detect for the presence of ice, then the heater 26 is now activated either manually or automatically. If more than one beam is used to detect for the presence of ice, then the probe heater 26 is not activated until all the beams are obstructed. The heater 26 will then continue to heat the probe until 10 seconds after at least one beam detector is cleared. Then the device is reset to continue monitoring for ice and ice build-up. By counting the number of probe heating cycles the probe can provide an assessment of total ice depth, and by measuring the frequency of heating cycles, i.e. the number of heating cycles per unit of time, the probe can provide a rate of ice accumulation.

Probe contamination may exist if the temperature of the probe is greater than 10 degrees Celsius, and at least one beam is interrupted for greater than 60 seconds, or if the temperature is below 10 degrees Celsius, and one beam is interrupted for greater than 60 seconds. Thus, there may be circumstances where both the probe inspect LED and the ice warning LED are lit at the same time, for example, where the temperature is initially above 10 degrees Celsius and a possible probe contamination is detected and then the temperature falls below 10 degrees Celsius, or where the temperature is below 10 degrees Celsius, ice obstructs the beams, and the heater is unable to clear the ice obstructing one of the beams. If there is an indication of probe contamination, the probe inspect LED on the cockpit display unit is activated. Additionally, the probe may notify the pilot of the presence of ice or contamination by audible means such as a warning tone sounding in the pilot cabin, by visible means such as warning lights, flashing lights, annunciator lights, or any combination thereof. FIG. 9 shows a preferred form of a cockpit display module that may be used with this device, and shows power-on LED 60, ice warning LED 62, probe inspect LED 64, and a power switch 66.

The probe distinguishes between ice and fluid by optical intensity fluctuations and attenuation due to thickness of the matter. In a preferred form, a threshold is arbitrarily set, for example, 25%, of original intensity. Ice or contamination is presumed when the original intensity has been reduced below the threshold. Fluid is presumed to be adjacent to the recessed surface 12 if the beam intensity fluctuates from below and above the threshold at least once in a 10-second cycle. The electromagnetic wavelength of the beams is preferably selected such that a thin layer of ice, water or de-icing/anti-icing fluid on the walls of the recessed surface 12 will not produce sufficient optical attenuation to trigger either ice or contamination indications. The beam wavelength is preferably such that most of the region along the recessed surface 12 must be filled by ice to trigger warning indications. Electromagnetic wavelengths longer than one micron are best suited for that purpose. Other embodiments of the system could include an integrated datalink antenna or surface mount ice sensor device. Additionally, the data collected by the probe may use a Global Positioning System to enhance and provide a wide range of useful information, specifically winds aloft speed and direction. GPS data will provide information regarding the aircraft locations such that the position of the atmospheric parameters measured can be exactly known. Also, it is anticipated that the probe may also provide output display to an annunciator lights, interface to a data box, or provide output display to a liquid crystal display or to a CRT.

FIG. 9 is a block diagram of a data gathering system employing the air data probe in FIG. 1 and shows an air data computer 48 operatively connected to the probe. The air data computer 48 collects and processes the atmospheric measurements obtained by the probe. Additionally, the air data computer 48 will provide ice detection electronics and algorithms necessary to interpret the outputs from the various sensors. In a preferred embodiment, the air data computer 48 will be operatively connected with the probe to allow placement of the air pressure sensors, magnetic heading sensor, and turbulence accelerometers within the air data computer 48. Additionally, the air data computer 48 may be built into the base of the probe, or may be physically separated from the probe. A GPS data box 49 collects real time position data from the GPS satellite network with the help of a GPS antenna 52. A system controller 50 is operatively connected to the air data computer 48 and the GPS data box 49 and combines these measurements to provide real time, position sensitive atmospheric data. A transmitter 51 is operatively connected to the system controller 50, and with the aid of the transmitter antenna 53, is adapted to transmit real time, position sensitive atmospheric data to a ground based network.

It will now be understood that what has been disclosed herein includes a new device for detecting the presence and thickness of ice, and other parameters, which is particularly advantageous for the aviation industry. Those having skill in the art to which the present invention relates will now, as a result of the teaching herein, perceive various modifications and additions which may be made to the invention, such as alternative shapes. Accordingly, all such modifications and additions are deemed to be within the scope of the invention which is to be limited only by the claims.

We claim:

1. A probe for detecting the presence and thickness of ice, the probe comprising:
   a housing in the shape of an airfoil having an outer surface and a recessed surface in said outer surface, said recessed surface including a base portion and first and second side portions extending away from opposite ends of said base portion;
   at least one beam emitter to generate a beam, said emitter is positioned to direct said beam from the first side portion of said recessed surface towards the second side portion of said recessed surface; and
   at least one beam detector, positioned to detect said beam after said beam has traveled from the first side portion of said recessed surface to the second side portion of said recessed surface.

2. An integrated ice detection and air data system for mounting on an aircraft, comprising in combination:
   ice sensing means for detecting the presence and accumulation of ice on an exterior surface of an aircraft, and
   air sensing means for monitoring at least one of the air parameters including air pressure, temperature, humidity, and pitot pressure.

3. The data system as set forth in claim 2 wherein said ice sensing means and said air sensing means include a common probe housing having an air data computer connected to said probe housing.

4. The data system as set forth in claim 3 wherein said probe housing has a pitot tube with an inlet opening in the air and coupled to a pressure sensor in said air data computer to sense pitot pressure.

5. The data system as set forth in claim 3 wherein said probe housing has two static ports on opposite sides opening into a static cavity in said housing coupled to a pressure sensor in said air data computer to sense static pressure at the surface of said probe housing.

6. The data system as set forth in claim 3 wherein said probe housing has a temperature and humidity sensor in communication with a hole in the housing to sense temperature and humidity.

7. The data system as set forth in claim 3 wherein said probe housing has an attachment plate for attaching the probe housing to the aircraft.

8. The data system as set forth in claim 3 wherein said probe housing is in the shape of an airfoil.

9. The data system as set forth in claim 8 including an external recessed surface in a leading edge of said airfoil and at least one beam emitter to direct a beam over said recessed surface to a beam detector to provide said ice sensing means.

10. The data system as set forth in claim 3 wherein said probe housing is outside the aircraft and said air data computer is inside the aircraft.

11. The data system as set forth in claim 3 wherein said air data computer calculates ambient pressure surrounding the aircraft from a surface pressure measurement of said probe housing and pitot pressure.

12. The data system as set forth in claim 3 wherein said air data computer calculates ambient temperature corrected for mach heating from surface pressure of said probe housing, pitot pressure, and temperature of said probe housing.

13. The data system as set forth in claim 3 wherein said air data computer calculates indicated air speed from pitot pressure and surface pressure of said probe housing.

14. The data system as set forth in claim 3 wherein said air data computer calculates true airspeed from surface pressure of said probe housing, pitot pressure and temperature of said probe housing.

15. The data system as set forth in claim 3 wherein said air data computer calculates ambient humidity surrounding the aircraft from surface pressure of said probe housing, pitot pressure and temperature of said probe housing.

16. The data system as set forth in claim 3 wherein said air data computer includes accelerometers to calculate turbulence severity.

17. The data system as set forth in claim 3 wherein said air data computer calculates turbulence from fluctuations in pitot pressure.

18. The data system as set forth in claim 3 wherein said air data computer includes a heading sensor providing an output and an input from said air data computer from a global positioning system, said output and input being combined with true airspeed to determine winds aloft speed and direction.

19. The data system as set forth in claim 3 including a global positioning system collecting real time position data from a satellite network operatively associated with an output of said air data computer for detecting the location of the aircraft during the sensing of ice and air data.

20. The data system as set forth in claim 3 wherein said air data computer is coupled to a global positioning system connected to a transmitter for formatting and transmitting air data, position and time information to the ground.

21. An integrated ice detection and air data system for mounting on an aircraft, comprising in combination:
   ice sensing means for detecting the presence and accumulation of ice on an exterior surface of an aircraft, and
   air sensing means for monitoring of the air parameters including air pressure, temperature and pitot pressure.

22. The data system as set forth in claim 21 including means for monitoring humidity.

23. The data system as set forth in claim 22 wherein said air data computer calculates ambient humidity surrounding the aircraft from surface pressure of said probe housing, pitot pressure and temperature of said probe housing.

* * * * *